US012578947B2

(12) United States Patent
Robitzsch et al.

(10) Patent No.: US 12,578,947 B2
(45) Date of Patent: Mar. 17, 2026

(54) METHODS AND APPARATUS FOR TRANSPARENT SWITCHING OF SERVICE FUNCTION IDENTIFIERS

(71) Applicant: InterDigital Patent Holdings, Inc., Wilmington, DE (US)

(72) Inventors: Sebastian Robitzsch, London (GB); Kay Hansge, Berlin (DE); Ulises Olvera-Hernandez, Saint-Lazare (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 386 days.

(21) Appl. No.: 17/924,309

(22) PCT Filed: May 13, 2021

(86) PCT No.: PCT/US2021/032296
§ 371 (c)(1),
(2) Date: Nov. 9, 2022

(87) PCT Pub. No.: WO2021/231760
PCT Pub. Date: Nov. 18, 2021

(65) Prior Publication Data
US 2023/0266961 A1 Aug. 24, 2023

Related U.S. Application Data

(60) Provisional application No. 63/024,903, filed on May 14, 2020.

(51) Int. Cl.
G06F 8/65 (2018.01)
G06F 9/54 (2006.01)
(Continued)

(52) U.S. Cl.
CPC .................. G06F 8/65 (2013.01); G06F 9/54 (2013.01); H04L 41/5041 (2013.01);
(Continued)

(58) Field of Classification Search
CPC ........... G06F 8/65; G06F 9/54; H04L 41/5041
See application file for complete search history.

(56) References Cited

U.S. PATENT DOCUMENTS

| | | | | | |
|---|---|---|---|---|---|
| 2008/0151778 | A1* | 6/2008 | Venkitaraman | ..... | H04L 67/1046 370/254 |
| 2016/0050116 | A1* | 2/2016 | Sheshadri | ........... | H04L 41/0813 709/221 |

(Continued)

FOREIGN PATENT DOCUMENTS

| | | | | | |
|---|---|---|---|---|---|
| JP | 2000268016 | A | 9/2000 | | |
| JP | 2002259125 | A * | 9/2002 | ....... | H04L 29/06027 |

(Continued)

OTHER PUBLICATIONS

ETSI TS 102 690 v.2.1.1 (Year: 2013).*
(Continued)

*Primary Examiner* — Jinsong Hu
*Assistant Examiner* — Justin Barry
(74) *Attorney, Agent, or Firm* — VOLPE KOENIG

(57) ABSTRACT

Method, apparatus, and systems for transparent switching of service function identifiers in wireless communications are provided. In an example, a method for wireless communications comprises sending configuration information to one or more Service Function Endpoints (SFEs) using a programmable application programming interface (API), implementing the API as a programmable middleware, and registering each of the one or more SFEs with a respective identifier according to a service description at the programmable middleware.

20 Claims, 11 Drawing Sheets

(51) Int. Cl.

| | |
|---|---|
| *H04L 41/5041* | (2022.01) |
| *H04L 67/10* | (2022.01) |
| *H04L 67/51* | (2022.01) |
| *H04W 4/70* | (2018.01) |

(52) U.S. Cl.
CPC .............. *H04L 67/10* (2013.01); *H04L 67/51* (2022.05); *H04W 4/70* (2018.02)

(56) References Cited

U.S. PATENT DOCUMENTS

| | | | | |
|---|---|---|---|---|
| 2016/0350816 | A1* | 12/2016 | Koli ................... | G06Q 30/0246 |
| 2017/0126512 | A1* | 5/2017 | Seed ........................ | H04L 67/51 |
| 2018/0097722 | A1 | 4/2018 | Callard et al. | |
| 2018/0103337 | A1* | 4/2018 | Di Girolamo .......... | H04L 67/12 |
| 2020/0100080 | A1* | 3/2020 | Mladin ................... | H04W 4/70 |
| 2021/0211510 | A1 | 7/2021 | Trossen et al. | |

FOREIGN PATENT DOCUMENTS

| | | | |
|---|---|---|---|
| JP | | 2003163678 A | 6/2003 |
| JP | | 2020174259 A | 10/2020 |
| WO | WO | 2016126238 A1 | 8/2016 |
| WO | WO | 2016163774 A1 | 10/2016 |
| WO | WO | 2019222703 A1 | 11/2019 |

OTHER PUBLICATIONS

InterDigital, "Next Generation Networks: Flexible Routing and Services", https://www.interdigital.com/solution/next-generation-networks, 21 pages.

Anonymous, "System Architecture for the 5G System", 3rd Generation Partnership Project (3GPP), Technical Specification Group Services and System Aspects, Document: 3GPP TS 23.501 V16.0.0, Stage 2, Release 16, Mar. 2019, 318 pages.

\* cited by examiner

METHODS AND APPARATUS FOR TRANSPARENT SWITCHING OF SERVICE FUNCTION IDENTIFIERS

CROSS-REFERENCE TO RELATED APPLICATION(S)

This application is a U.S. National Stage Application under 35 U.S.C. 371 of International Patent Application No. PCT/US2021/032296, filed May 13, 2021, which claims priority to and the benefit of U.S. Provisional Application No. 63/024,903 filed in the U.S. Patent and Trademark Office on May 14, 2020, the entire content of which being incorporated herein by reference as if fully set forth below in its entirety and for all applicable purposes.

SUMMARY

The disclosure generally relates to communication networks, wireless and/or wired. For example, one or more embodiments disclosed herein are related to methods and apparatus for transparent switching of service function identifiers. For example, transparent switching of service function identifiers may be used for dynamic end-to-end slicing and/or re-orchestration of Service Function Chains (SFCs).

In one embodiment, a method using service function identifiers for wireless communications may include sending configuration information to one or more Service Function Endpoints (SFEs) using a programmable application programming interface (API), implementing the API as a programmable middleware, and registering each of the one or more SFEs with a respective identifier according to a service description at the programable middleware. The method may also include mapping a destination Service Function (SF) name to a Service Function Identifier (SFID) using the programable middleware for each respective SFE. The method may further include determining that a mapping between a service function (SF) name and a first SFID has changed and updating the mapping with a second SFID to map the SF name.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

One or more embodiments disclosed herein are related to methods and apparatus for transparent switching of service function identifiers. In one embodiment, methods and apparatus for transparent switching of service function identifiers for dynamic end-to-end slicing and/or re-orchestration of Service Function Chains (SFCs) are provided.

Communications Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
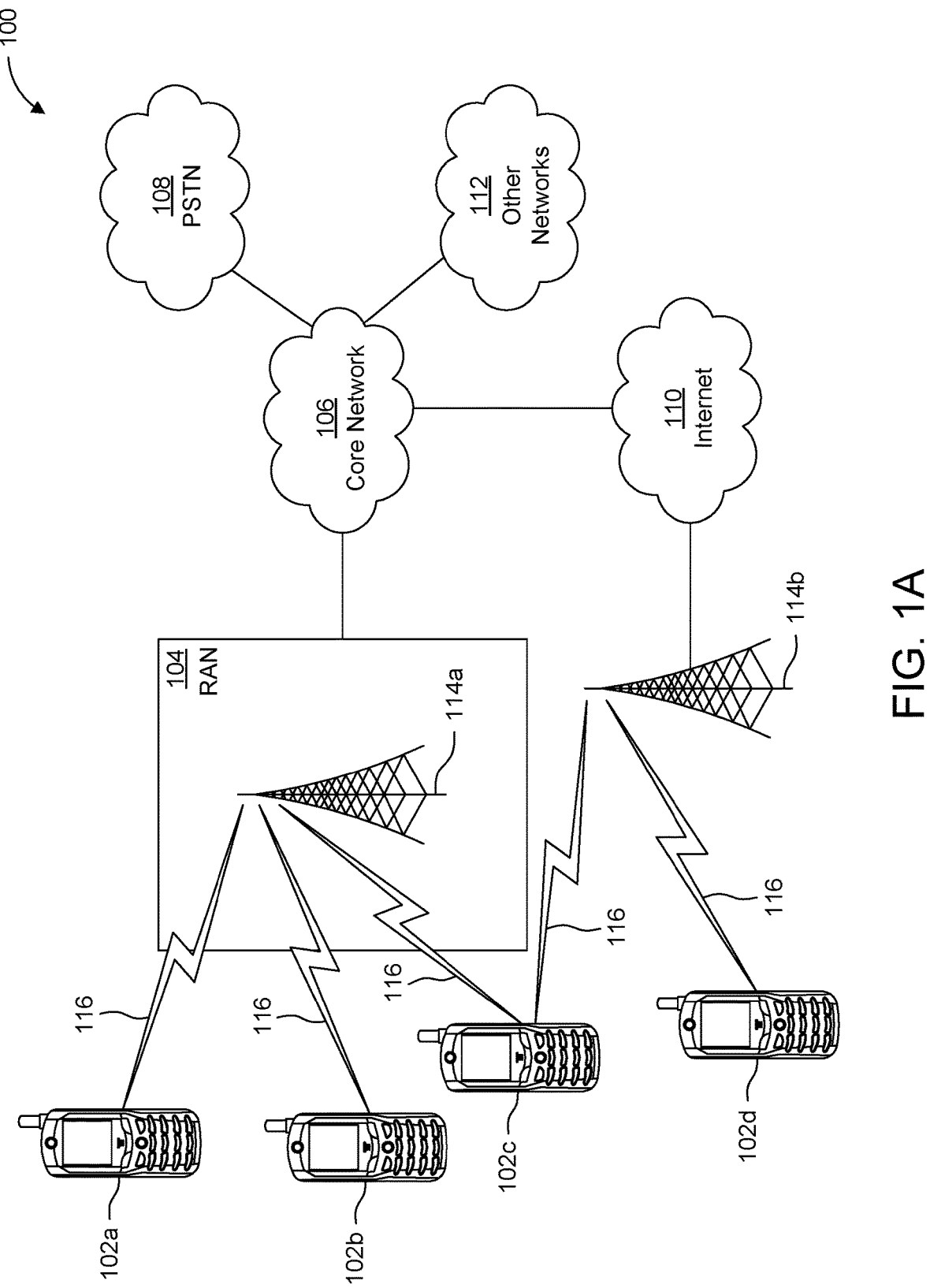
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
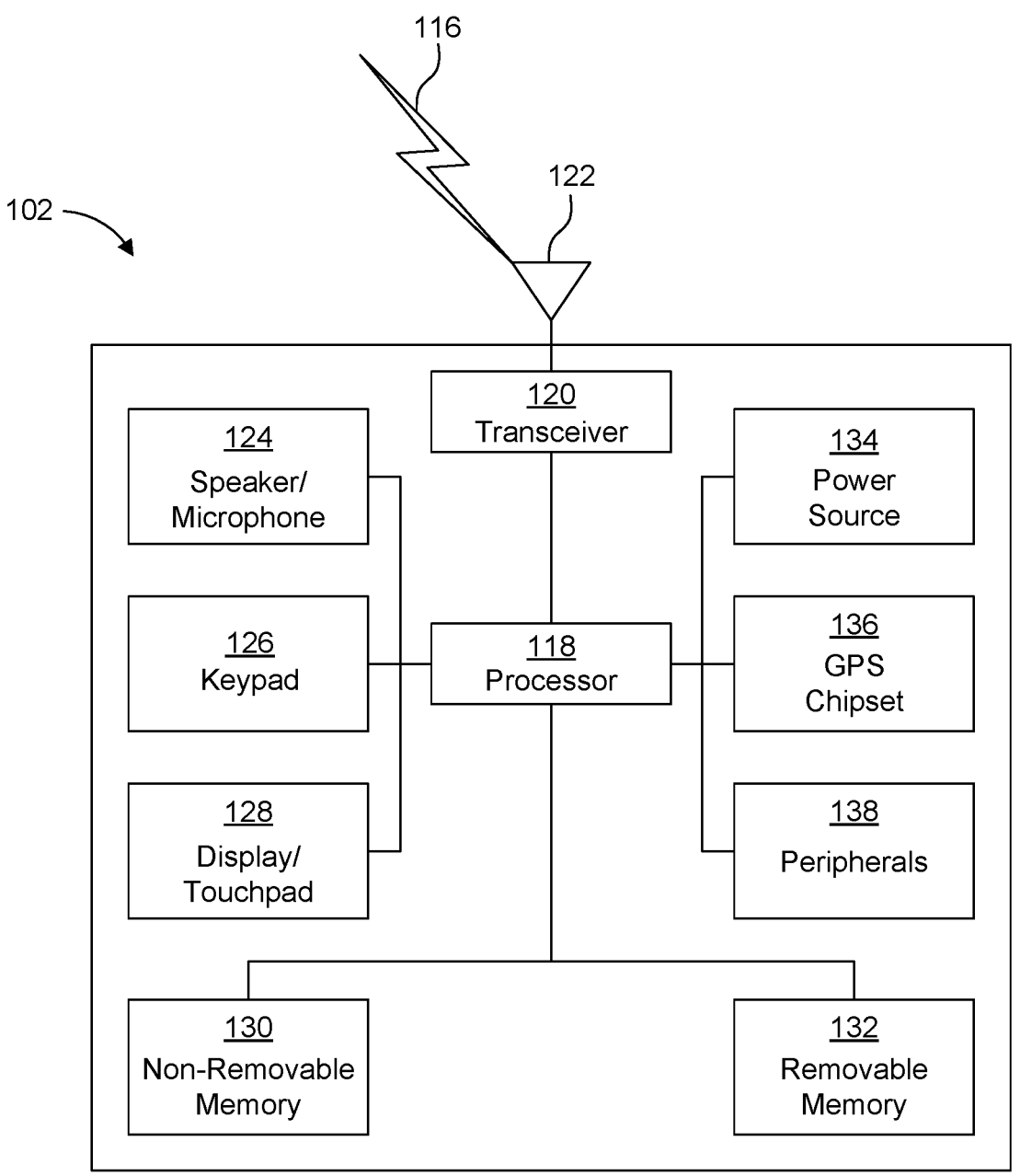
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
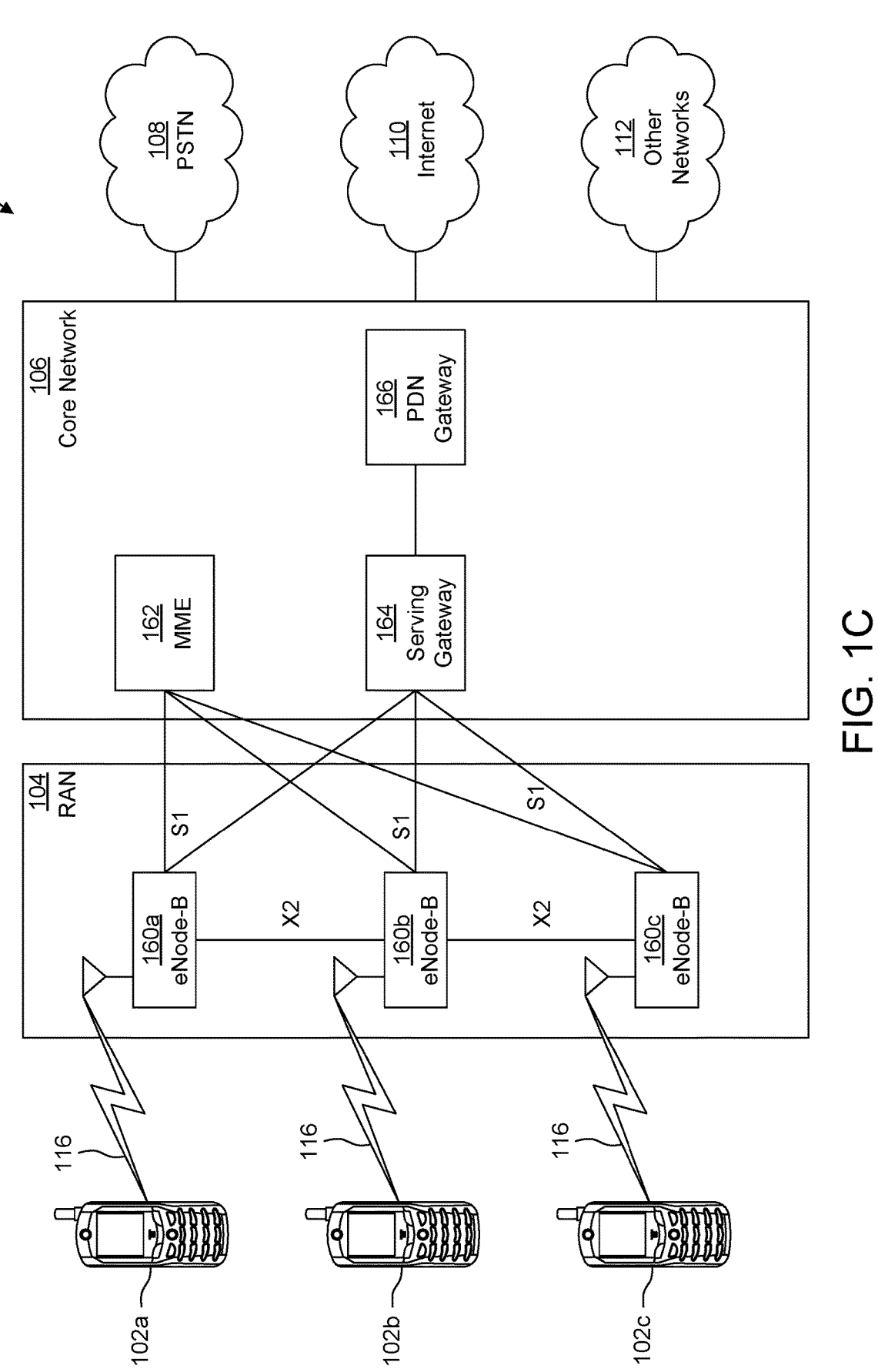
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
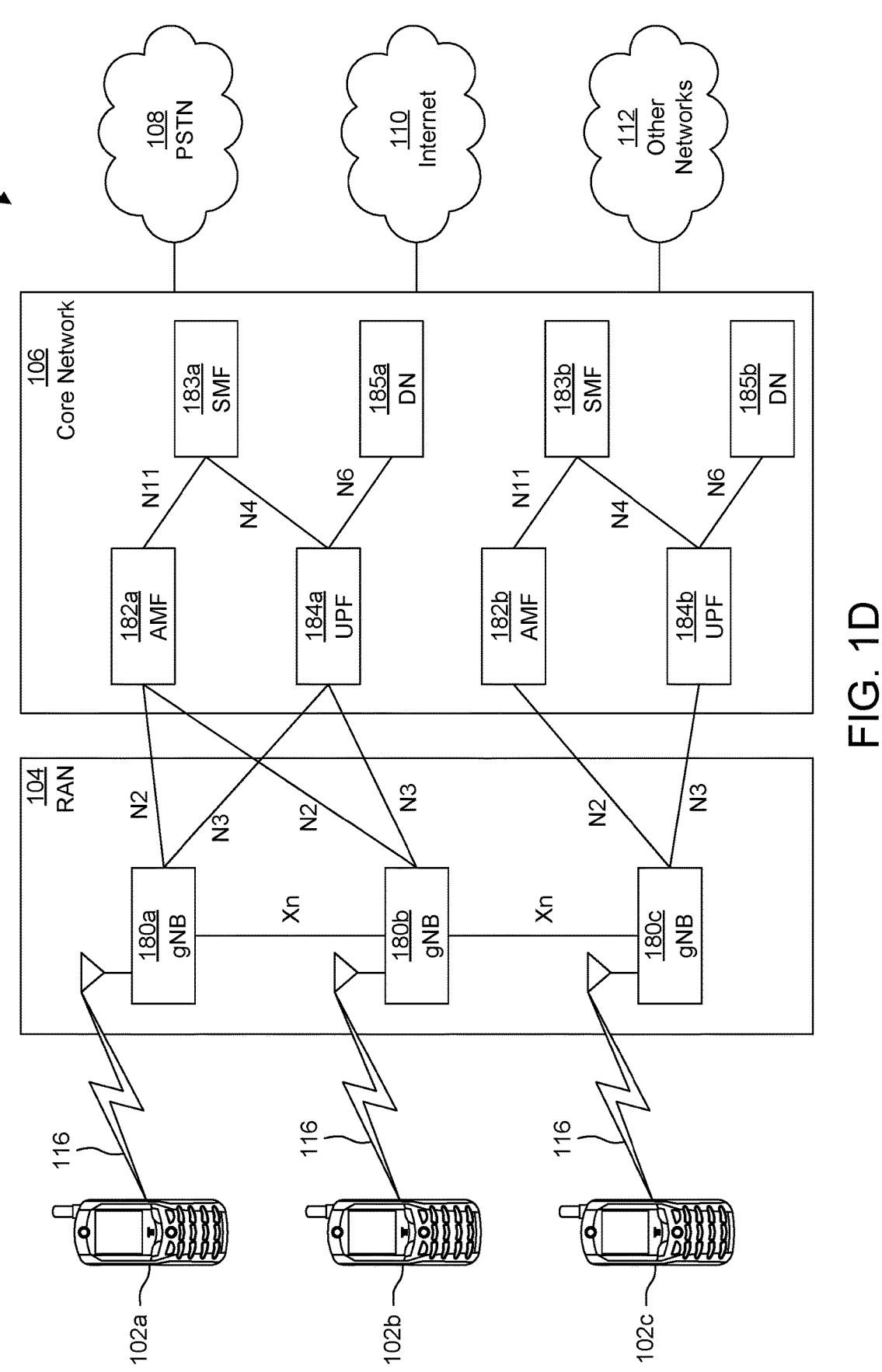
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Service Function Chaining

Service Functions (SFs) are widely deployed and essential in many networks. SFs may provide a range of features such as security, wide area network (WAN) acceleration, and/or server load balancing. SFs may be instantiated at one or more different points in the network infrastructure such as data centers, the WAN, the core network (CN), the RAN, and on mobile nodes or devices (e.g., WTRUs or UEs).

SFs, also referred to as Virtualized Network Functions (VNFs), or functions, are hosted on computing, storage and networking resources. SFs are becoming more prevalent, even in traditionally closed environments, such as cellular networks which are now embracing cloud native technology. Therefore, in some 5G-based systems, SFs may be referred to as Network Functions Services (or NF Services), and these NF Services can be accessed using mainstream Internet protocols such as Hypertext Transfer Protocol (HTTP). The hosting environment of a function disclosed herein is called Service Function Provider or Network Function Virtualization (NFV) Infrastructure Point of Presence (NFVI-PoP) (e.g., using ETSI NFV terminology). Services are typically formed as a composition of SFs (or VNFs), with each SF providing a specific function of the whole service. Services also referred to as Network Services (NSs), e.g., according to ETSI terminology.

Communication systems designed for the enablement of highly dynamic service orchestration and lifecycle changes need to fulfill one or more of the following criteria to deliver the requirements 5G and/or future systems have promised:

A service-based system architecture. Moving away from monolithic functions to microservices (represented as instances of services that may be requested through application programming interfaces (APIs)) is one of the key changes in system architectures for telecommunication systems. To deliver highly scalable services, a service-based system architecture has been introduced to telecommunications, for example, 5G 3GPP enhanced Service-based Architecture (eSBA) work [1].

Service Routing—a routing of packets between service instances must allow endpoint selection and re-selection in a timely manner thus enabling end-to-end slicing of network resources.

Cloud-native Orchestration—orchestration of microservices managed to optimize resource utilization independent to an underlying infrastructure or platform.

End-to-end (E2E) Slicing—the slicing of networks (as well as compute resources) is one of the 5G features enabled by programmable infrastructures. While compute resources are "sliced" by cloud-native orchestration principles and network resources are the focus of this work, access to these resources does not necessarily require further tagging of packets with additional heads/information, on top of the already "sliced" compute and storage resources, e.g., by using IP flow, VLAN, MPLS. When using name-based routing [3], the necessity to further slice the switching fabric on Layer 2.5 or 3 becomes obsolete and is not required any longer. Nonetheless, it does not exclude the ability to additionally tag each name-based slice.

For a consistent terminology across this disclosure, the following conventions will be used to describe services and their instances, when considering a typical client-server principle:

Client: an entity requesting services from a server, also being described as an endpoint;

Server: an entity serving requests originated from clients is described as a service endpoint. For example, a Network Function Service (NFS) (e.g., in 3GPP or 5G) or an IETF Service Function (SF) may be considered as a service endpoint; and Service Function Endpoint (SFE): a deployed instance of a Service Function and equivalent to a 5G 3GPP CP Network Function Service Instance.

When referring to 3GPP (e.g., eSBA feature), legacy monolithic network elements were decomposed into functional entities referred to as network functions (NFs). Later further granularity was achieved with the introduction of Network Function Services (NFSs) and Network Function Service Instances. As described above, Network Functions Services (NFSs) can be considered as service endpoints. In 3GPP 5G, these concepts only apply to the Control Plane (CP), leaving the User Plane (UP) for further study.

Cloud-native orchestration principles however require a more fine-tuned differentiation between service endpoints/Network Function Services and their instances, for both CP and UP. For this purpose, the work in the Service Function Chaining (SFC) IETF group is taken as the basis for cloud-native orchestration principles for services in telecommunication systems. This group defines a Service Function Chain to be composed of service functions (SFs) which have a 1:n relationship with deployed instances of an SF defined as service function endpoints (SFEs). For example, an SF may be associated with one or multiple SFEs (e.g., n SFEs) in a Service Function Chain. As HTTP is the de-facto application layer protocol for all endpoints to communicate, a Fully Qualified Domain Name (FQDN) is being used to identify a service function. The FQDN is also described as the Service Function Identifier (SFID). In some cases, SFIDs do not have to be FQDNs in case HTTP is not the application layer protocol.

Figure 2:
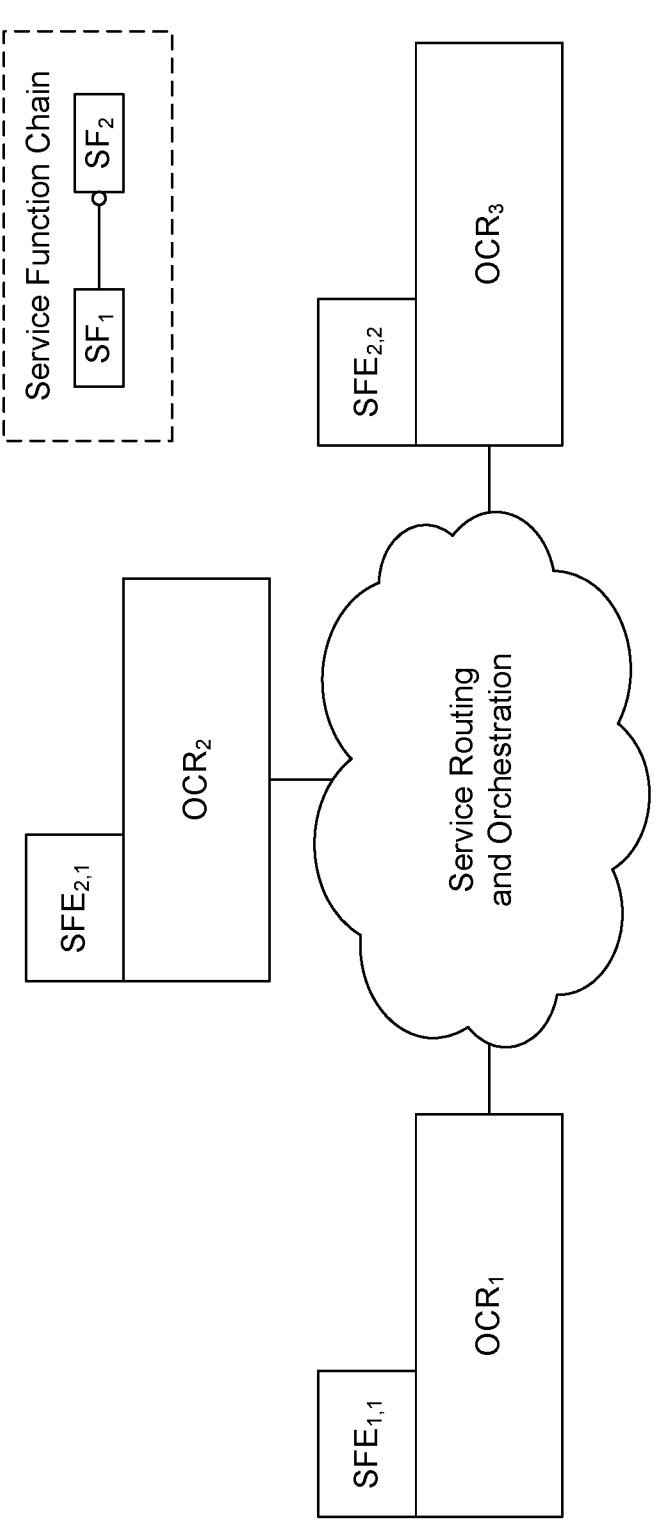
FIG. 2 is a diagram illustrating a high-level system view of a service-based communication system, according to one or more embodiments.

FIG. 2 illustrates a high-level system view of a service-based communication system, which includes service routing and orchestration, and a service function chain comprising two SFs, $SF_1$ and $SF_2$, that is orchestrated across the three orchestrateable compute resources (OCR) $OCR_1$, $OCR_2$, and $OCR_3$. The resulting deployed SFEs are labelled as $SFE_{<SF\_ID>,<INSTANCE\_ID>}$, where <SF_ID> is the numerical identifier of the service function ($SF_1$ or $SF_2$) and <INSTANCE_ID> is the numeric identifier of the instance of a particular SF. In an example below, $SF_1$ is deployed once on $OCR_1$, labelled as $SFE_{1,1}$, while $SF_2$ is deployed as two instances (SFEs) $SFE_{2,\ 1}$ and $SFE_{2,\ 2}$ on $OCR_2$ and $OCR_3$, respectively. When $SFE_{1,\ 1}$ aims to communicate with $SF_2$ (any of the two instances deployed), service routing may decide where to route the packet, based on what capabilities the routing platform has to offer.

In various embodiments, an OCR may be a compute node managed by an infrastructure provider/operator or terminals (e.g., a WTRU or a UE). The example of service function chain illustrated in the top right of FIG. 2 (a service function chain comprising two SFs, $SF_1$ and $SF_2$,) is used across the two examples given below.

Figure 3:
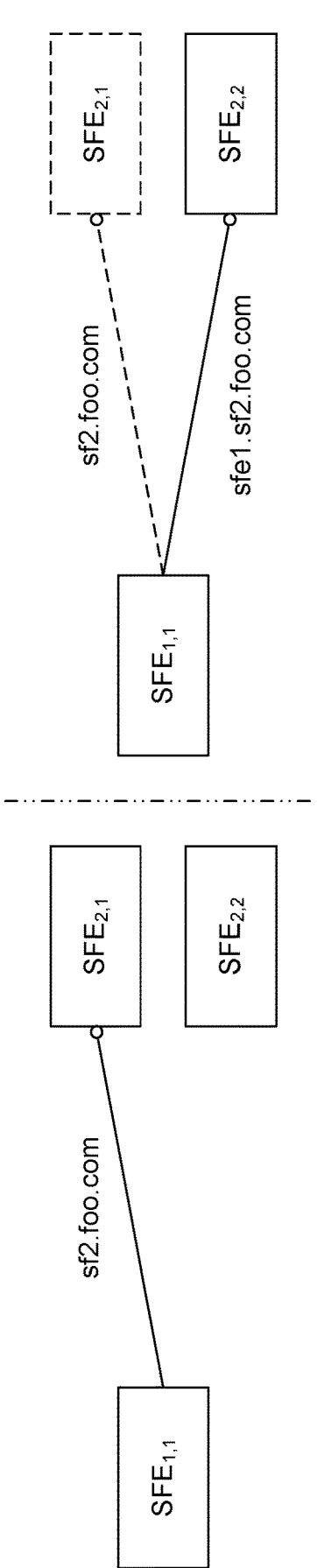
FIG. 3 is a diagram illustrating an example of pinning of service function endpoints, according to one or more embodiments.

FIG. 3 illustrates a scenario when $SF_1$ is reaching $SF_2$ via the FQDN sfe2.foo.com. In this example, service routing determines to use $SFE_{2,\ 1}$ as the instance of $SF_2$ serving $SFE_{1,\ 1}$. However, for private (non-public) network scenarios, it may be desirable enforcing the use of a particular SFE or a set of SFEs based on certain context, such as regional preferences, time of the day, or privacy concerns, for instance. This action, defined as pinning [2], describes methods and procedures to perform name-based slicing using a new SFID (e.g., FQDN) to enforce $SFE_{2,1}$ to serve $SFE_{1,1}$ by using a (e.g., temporary) SFID which may be the original SFID and a prefix prepended. In the example below, the SFID sf2.foo.com was prepended by sfe1 resulting in sfe1.sf2.foo.com.

Figure 4:
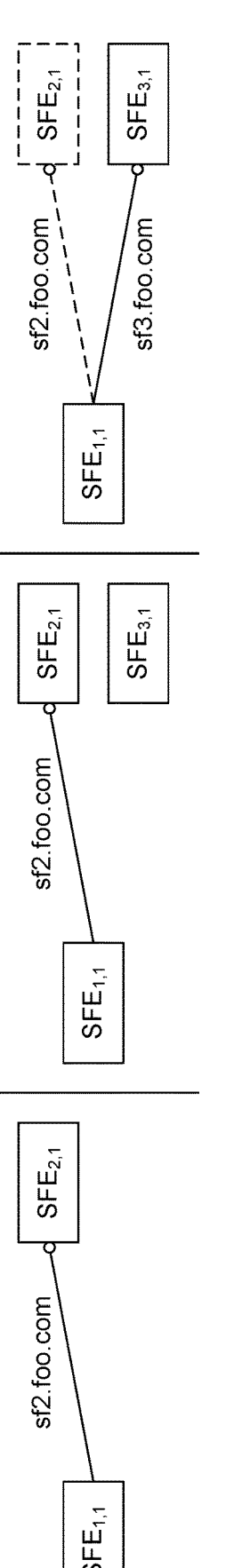
FIG. 4 is a diagram illustrating an example of re-orchestration of a service function chain according to one or more embodiments.

FIG. 4 illustrates a scenario when the entire service function chain is re-orchestrated due to a change in the number of SFs that the chain is composed of. Instead of $SF_1$ and $SF_2$, $SF_2$ is further decomposed into $SF_3$ and other SFs, which results in a chain relationship if $SF_1 > SF_3 > SF_n$ instead of $SF_1 > SF_2$. The left sub-figure in FIG. 4 illustrates the initial communication between $SFE_{1,1}$ to $SFE_{2,1}$ using the SFID sf2.foo.com. The re-orchestration is illustrated in the middle of FIG. 4 where the new SF, $SF_3$, is deployed as $SFE_{3,1}$. Afterwards, $SFE_{3,1}$ is registered against service routing with the new SFID sf3.foo.com which must be then communicated to all instances of $SF_1$ (e.g., $SFE_{1,1}$) to be used in any future HTTP transaction towards $SF_2$.

In both scenarios illustrated in FIG. 3 and FIG. 4, the problem remains how SFEs are made aware that one or more SFEs are no longer reachable and a new SFE with a new SFID needs to be used. Even though SFEs can query information about themselves from the orchestrator, e.g., a chain name, service function name, or the parent domain to construct the SFID for the next SF, any change in SFID to reach the next SF is not programmable at the moment and therefore a runtime update of SFE's SFIDs cannot be realised. Each component inside a service function is programmed to reach the next SF in the chain using a hardcoded name such as sf1. Some network platforms [3] may implement an interface to query the parent domain under which the entire service chain was deployed, e.g. foo.com. If the entire chain is re-orchestrated at runtime, a change of code is not feasible. This applies to the pinning of SFEs to particular instances of another SF (pinning). Furthermore, SFID updates should be made as transparent as possible for the service itself, and not to affect the application developers and their code development workflow.

Transparent Switching of Service Function Identifiers

In various embodiments, a middleware and programmable API for service function endpoints (network service functions) may be used to program the service function identifier (FQDN) into an active instance without the necessity for the application to change any code or socket communication.

When applications that require HTTP libraries are written, modern libraries perform one or more of the following steps upon receiving the demand by the application to send out a request to a host. In one embodiment, if the host is an FQDN, the library may perform a DNS lookup to establish the IP address of the service endpoint serving the FQDN. The IP address libraries may be used to establish a session using a transport layer protocol of choice towards the service endpoint.

Figure 5:
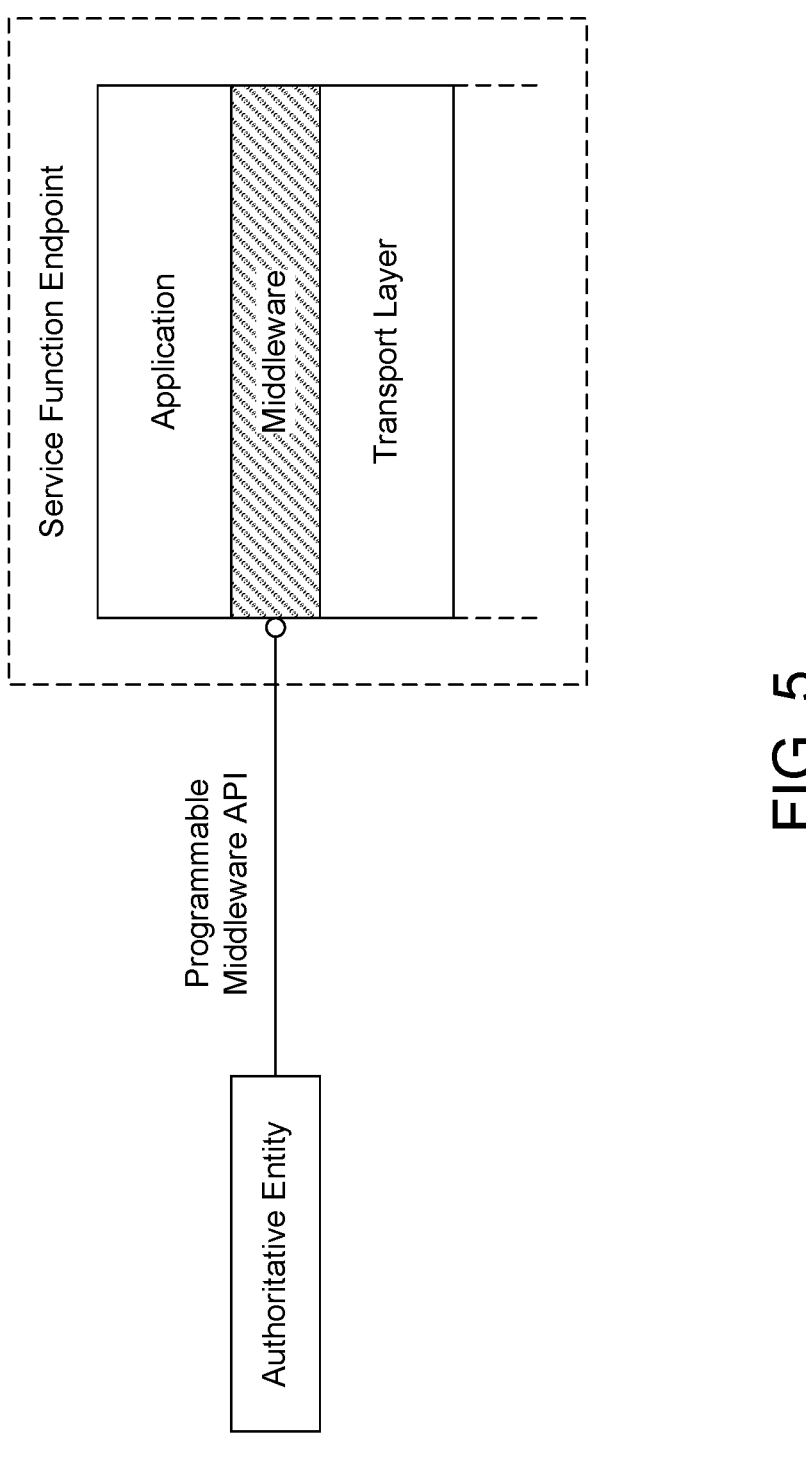
FIG. 5 is a diagram illustrating a middleware and programmable SFID interface for SFEs, according to one or more embodiments.

In various embodiments, application developers do not include functionality in their applications to perform dedicated actions for DNS lookups and TCP socket creation/handling, as this is done by library calls. One or more embodiments hereafter discussed do not impose any special requirements on application developers, other than calling yet one more library. As a result, a programmable middleware is proposed which either becomes part of existing widely used libraries or such middleware is given to developers as an additional cross-system shim layer (library). As mentioned above, a change of SFIDs would usually require updates in the application itself. The proposed solution introduces a programmable interface and its procedures allowing the programming of SFIDs across SFEs remotely without any change in the application itself. A schematic drawing of the present disclosure is given in FIG. 5, which illustrates an authoritative entity on the left with access to a programmable API, and the proposed OSI layers of a service function endpoint on the right, with a new middleware between the application and the transport layer. While the present disclosure removes the need for applications to resolve FQDNs and to establish transport layer sessions, these steps may still be performed and are moved into the middleware itself.

Both the programmable middleware API as well as the middleware itself are described in further details below.

Middleware

Figure 6:
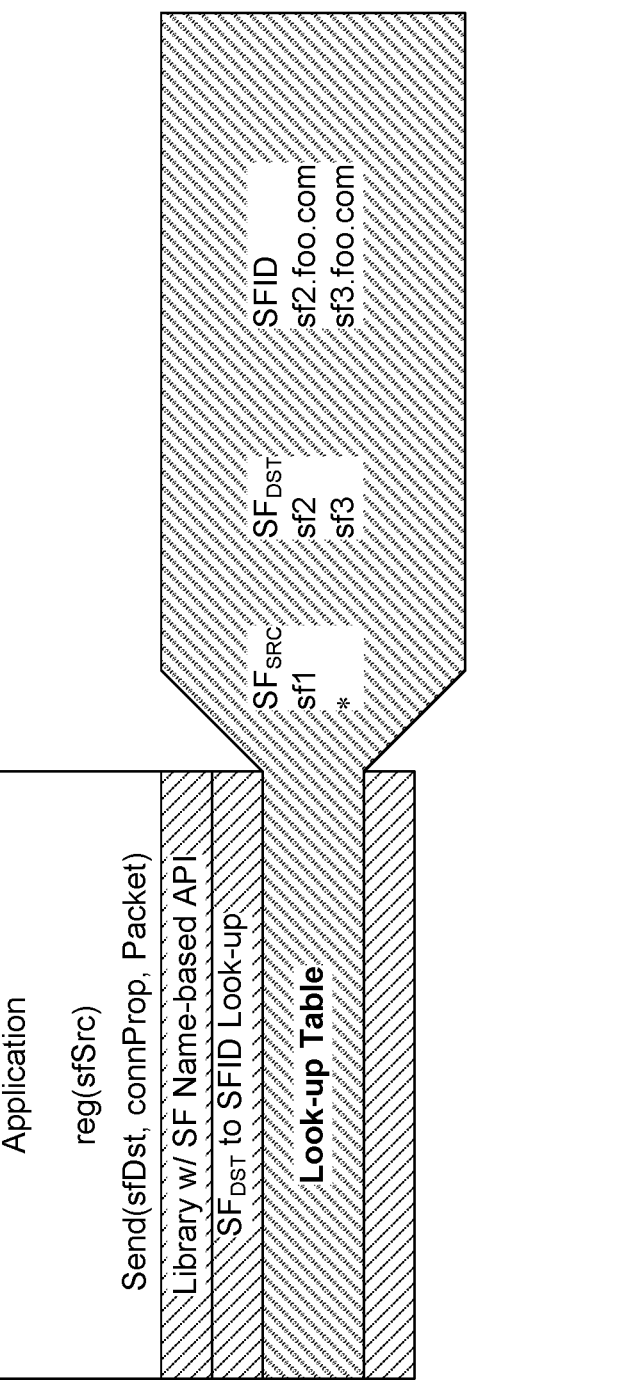
FIG. 6 is a diagram illustrating an example of middleware with library for SF Name-based API, according to one or more embodiments.

As illustrated in FIG. 6, the proposed middleware is composed of an application library with name-based I/O calls and a look-up table which is programmable. The application uses the middleware library and its I/O call function send( ) to send data via a transaction to another SF. In comparison to standard library calls which require the FQDN or IP address (or SFID), the proposed library requires only the name of the SF to send data. Furthermore, a registration function reg( ) is available to allow applications to communicate their service function name.

The send I/O call requires a connection properties argument connProp informing the middleware about information about the configuration of lower OSI layers. A full list of the connProp fields is given in Table 1. In some examples, by placing the connProp argument into each send call allows the same application to initiate different type of transactions, e.g. HTTP, HTTP/2 or SIP.

TABLE 1

| Properties of the connection properties (connProp) argument | |
| --- | --- |
| Field | Description |
| appProto | The application layer protocol used to construct the packet, e.g. HTTP or SIP |
| secProto | The security protocol if one required, e.g. TLS |
| transProto | The transport protocol required for the communication, e.g. TCP or UDP |
| transPort | The transport port the destination SF is listening on |

The middleware may hold a look-up table which maps the destination SF name to an SFID (such as an FQDN or IP address). If an SFID update arrives, the middleware updates the look-up table without the application having any knowledge about that. Upon such updates, the middleware performs checks of active sessions still using the old SFID and either lets them finish their transaction or enforces a transparent switch over to the new SFID, if the application layer protocol allows such behaviour. In some examples, the policy to either wait or switch immediately is communicated through the programmable API.

When a new transaction request is being issued by an application, the middleware may search for the destination SF name given in the send( ) call, and the middleware may find an SFID to replace the value inside the request packet. For instance, for HTTP as the application layer protocol, the middleware may replace the value for the HTTP header field Host with the SFID, and the SFID was obtained by the middleware from its look-up table. The actual packet including header and payload may be constructed by the application itself.

When aiming for an access control for end-to-end slices, the middleware may implement this feature using the look-up table. As all applications have to register against their middleware first, the look-up table can be also programmed to enforce that only certain service functions are allowed to call send( ) to other SFs. As illustrated in FIG. 6, the field $SR_{SRC}$ has either a wild card (asterisk) or the name of the SF that is allowed to communicate with another SF.

Programmable Middleware Interface

In various embodiments, in order to communicate a change in SFIDs for SFs, a new interface is introduced, which allows the orchestrator to communicate such change to each operational SFE. This disclosure includes programmability aspects that enable the orchestrator to deploy changes quickly. The interface may allow any of these actions:

Add: A new SF name and SFID are communicated to the middleware of an SFE.

Update: An SF and SFID are communicated to the middleware of an SFE including a policy how to treat on-going application transactions to the old SFID.

Delete: A pair composed of the SF name and its SFID are deleted from the look-up table including any switching policy that might had been communicated.

The interface may be realized as a CRUD service endpoint using HTTP as the application protocol. The middleware is listening to a pre-defined and globally available transport layer port. In some examples, the Internet Assigned Numbers Authority (IANA) port definition may be used or applied for the transport layer port.

-continued

```
    "sf_src": "*",
    "sf_dst": "sf3",
    "sfid": "sf3.foo.com",
    "policy": "immediately"
  }
]
```

Figure 7:
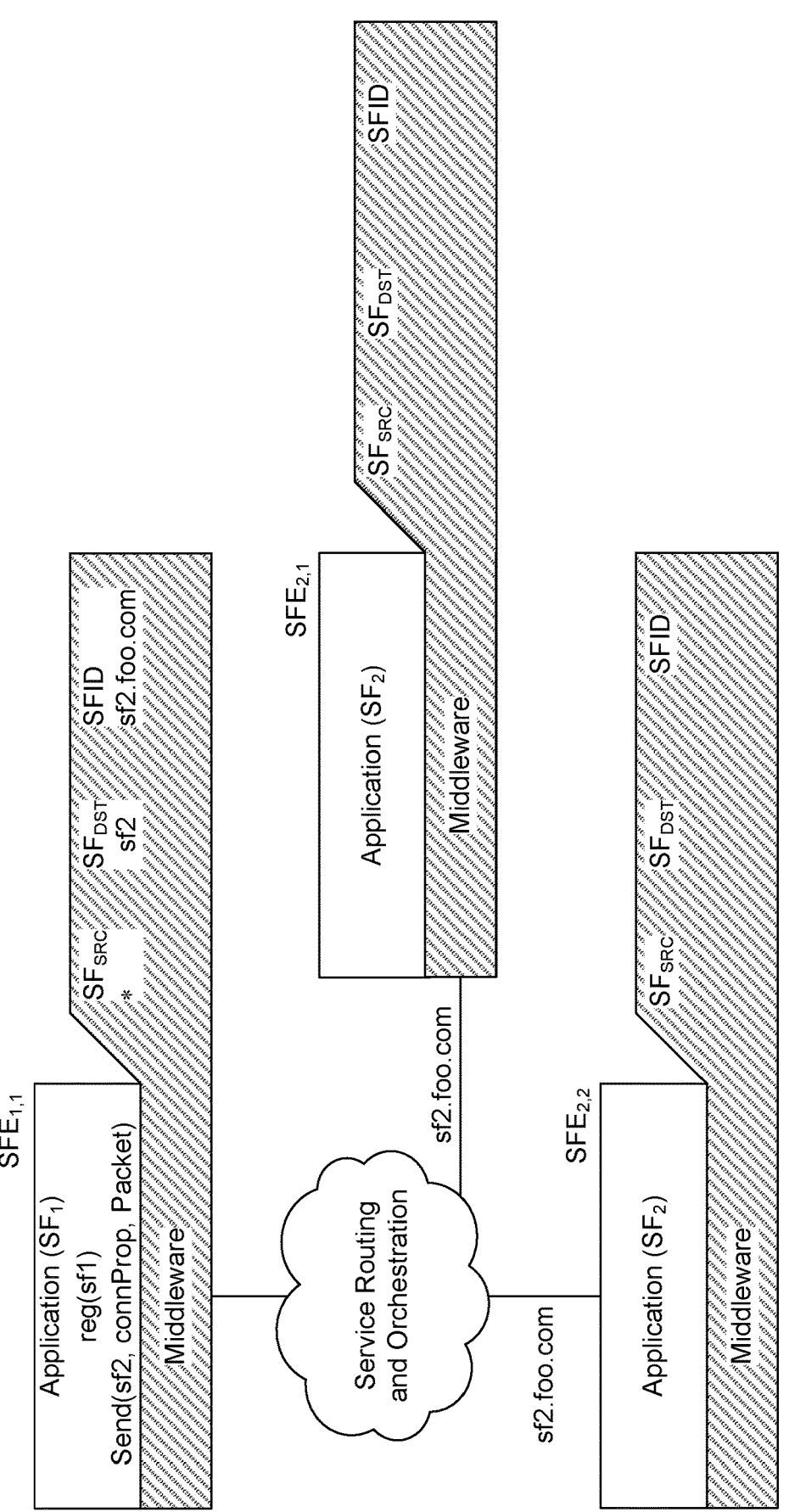
FIG. 7 is a diagram illustrating an example of using a look-up table (e.g., state before) for a pinning of service function endpoints, according to one or more embodiments.

To demonstrate the methods and procedures of the middleware, the pinning use case of an SFE (e.g., as shown in FIG. 3) is being used. FIG. 7 illustrates two service functions $SF_1$ and $SF_2$, where $SF_1$ is deployed once as $SFE_{1,1}$ and $SF_2$ twice, $SFE_{2,1}$ and $SFE_{2,2}$. Both SFEs ($SFE_{2,1}$ and $SFE_{2,2}$) are registered against service routing using the SFID sf2.foo.com. $SFE_{1,1}$ aims to start a new transaction with $SF_2$ and service routing decides which $SFE_{2,x}$ to choose. The application representing $SF_1$ has registered itself against its middleware and the SFID sf2.foo.com has been programmed for a destination SF name of sf2. The other middleware look-up tables are empty, as the SF2 application does not start transaction and only acts as a service endpoint.

When $SFE_{1,1}$ sends a request to the SF with name sf2 which is mapped to the SFID sf2.foo.com, as the source SF field, $SF_{SRC}$ comprises a wildcard. If the request uses HTTP, the middleware manipulates the value for the HTTP header field Host from sf2 to the SFID of the lookup table before the request leaves the SFE's communication stack. Service routing then decides to route the request to $SFE_{2,1}$. $SFE_{2,1}$ then may handle the request and responds accordingly.

Before the next transaction is being initialized by $SFE_{1,1}$, $SFE_{1,1}$ (or service routing) may decide to pin $SFE_{1,1}$ to

TABLE 2

Exemplary properties of parameters used in a programmable middleware interface

| Field | Description | Mandatory |
|-------|-------------|-----------|
| action | This field specifies the action of the rule, i.e., should it be added, an existing one updated or an existing one deleted. Valid values are: add, update, delete. | Yes |
| sf_src | This field specifies the name of the SF that is the endpoint in a transaction with another service function. Valid values are any string of arbitrary length or a wildcard character allowing any endpoint to match with this rule. | Yes |
| sf_dst | This field specifies the name of the SF that is the service endpoint in a transaction with another service function. Valid values are any string of arbitrary length or a wildcard character allowing any service endpoint to match with this rule. | Yes |
| sfid | This field specifies the SFID of the service endpoint. | Yes |
| policy | This field allows to set an optional policy on how to switch on-going transactions in case an update action command arrives. Valid values are: immediately, end-of-transaction. | No |

The API may be used to submit a single or a concatenation of actions. The example below uses json as the payload format for an HTTP POST command that populates information, as illustrated in FIG. 6.

```
[
  {
    "action": "add",
    "sf_src": "sf1",
    "sf_dst": "sf2",
    "sfid": "sf2.foo.com"
  },
  {
    "action": "add",
```

Figure 8:
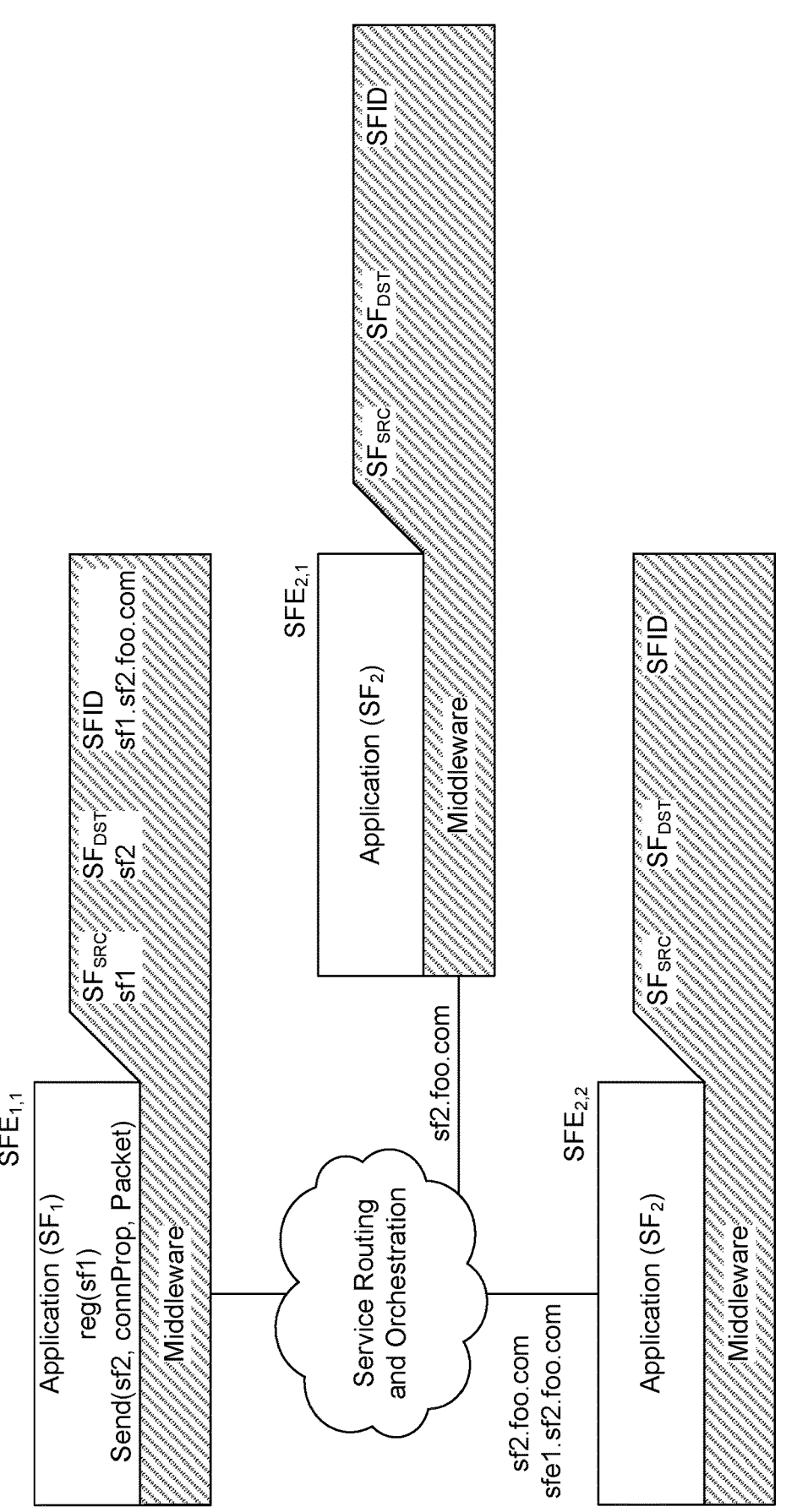
FIG. 8 is a diagram illustrating an example of the look-up table (e.g., state after) for a pinning of service function endpoints, according to one or more embodiments.

$SFE_{2,2}$ without leaving it to the underlying service routing to decide which SFE to choose. This is achieved by using the unique SFID sfe1.sf2.foo.com which is programmed by an authoritative entity into $SFE_{1,1}$'s middleware. Additionally, the new SFID may be also registered against service routing. The resulting set-up is given in FIG. 8.

When the next request is being sent by $SFE_{1,1}$ to the service endpoint named sf2, the middleware finds a new FQDN in its look-up table and issues a request to this SFID, after manipulating the HTTP header again, if HTTP is used as the OSI Layer 7 protocol. As only $SFE_{2,2}$ is registered with this FQDN against service routing, the request is routed to $SFE_{2,2}$ where it is being served. On $SFE_{1,1}$, only the application registered initially with name sf1 will be able to have the middleware to map them to the pinned FQDN which allows access control for the end-to-end slice.

In various embodiments, methods and apparatus for transparent switching of service function identifiers are provided. For example, transparent switching of service function identifiers may be used for dynamic end-to-end slicing and/or re-orchestration of Service Function Chains (SFCs).

In one embodiment, a method for wireless communications may include sending configuration information to one or more Service Function Endpoints (SFEs) using a programmable application programming interface (API), implementing the API as a programmable middleware, and registering each of the one or more SFEs with a respective identifier according to a service description at the programmable middleware. The method may also include mapping a destination Service Function (SF) name to a Service Function Identifier (SFID) using the programable middleware for each respective SFE. The method may further include determining that a mapping between a service function (SF) name and a first SFID has changed and updating the mapping with a second SFID to map the SF name.

In one embodiment, the method(s) described herein may further include receiving one or more programmable updates from a chain operating entity. The chain operating entity may be an authoritative entity and/or an orchestrator. The one or more programmable updates may include the service description.

In one embodiment, the service description is a description associated with a Service Function Chain (SFC).

In one embodiment, the method(s) described herein may be implemented in a wireless transmit/receive unit (WTRU) that operates as an SFE of the one or more SFEs and communicates with other SFEs of the one or more SFEs by name.

In one embodiment, the method(s) described herein may also include determining that one or more SFs are re-chained and updating a SF name-to-SFID mapping based on the determination.

In one embodiment, any of the SFID, the first SFID, or the second SFID is a Fully Qualified Domain Name (FQDN) or an IP address. The identifier may be an FQDN or an IP address. The SF name may be an FQDN or an IP address.

In one embodiment, the method(s) described herein may also include using the programmable API to remotely program a look-up table of the programmable middleware.

Each of the following references are incorporated by reference herein: [1] 3$^{rd}$ Generation Partnership Project (3GPP), "System architecture for the 5G System (5GS), v16.0.0, TS 23.501", 2019; [2] PCT Publication No. WO 2019/222703; and [3] InterDigital, "Next Generation Networks: Flexible Routing and Services", https://www.inter-digital.com/solution/next-generation-networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for wireless communications, comprising:
sending configuration information to one or more service function endpoints (SFEs) using a programmable application programming interface (API);
implementing the API as a programmable middleware;
registering each of the one or more SFEs with a respective service function identifier (SFID) according to a service description at the programable middleware;
determining, for a respective SFE of the one or more SFEs, a destination service function (SF) name associated with a respective SFID using the programable middleware; and
communicating with the respective SFE using the destination SF name.

2. The method of claim 1, further comprising:
mapping, for each respective SFE, the destination SF name to the respective SFID using the programable middleware.

3. The method of claim 1, further comprising:
determining that the association between the destination SF name and the respective SFID has changed; and
updating the association with a second SFID to associate with the destination SF name.

4. The method of claim 3, wherein any of the SFID, the respective SFID, or the second SFID is a fully qualified domain name (FQDN) or an Internet protocol (IP) address.

5. The method of claim 1, further comprising receiving one or more programmable updates from a chain operating entity.

6. The method of claim 5, wherein the chain operating entity is an authoritative entity, a service chain controller, or an orchestrator.

7. The method of claim 5, wherein the one or more programmable updates include the service description.

8. The method of claim 1, wherein the service description is a description associated with a service chain (SC).

9. The method of claim 1, wherein the method is implemented in a wireless transmit/receive unit (WTRU) that operates as an SFE of the one or more SFEs and communicates with other SFEs of the one or more SFEs using the destination SF name.

10. The method of claim 1, further comprising:
determining that one or more SFs are re-chained; and
updating a SF name-to-SFID association based on the determination.

11. The method of claim 1, wherein any of the SFID or the destination SF name is a fully qualified domain name (FQDN) or an Internet protocol (IP) address.

12. The method of claim 1, wherein the implementing the API as the programmable middleware comprises using the programmable API to remotely program a look-up table of the programmable middleware.

13. The method of claim 1, wherein the respective SFE of the one or more SFEs is associated with at least one of a network function, a network function service, and a network service.

14. A wireless transmit/receive unit (WTRU) for wireless communications, comprising:
at least one processor;
a memory operably coupled to the at least one processor; and
a transceiver operably coupled to the at least one processor, the at least one processor, the memory and the transceiver configured to:
send configuration information to one or more service function endpoints (SFEs) using a programmable application programming interface (API);
implement the API as a programmable middleware;
register each of the one or more SFEs with a respective service function identifier (SFID) according to a service description at the programable middleware;
determine, for a respective SFE of the one or more SFEs, a destination Service Function (SF) name associated with a respective SFID using the programable middleware; and
communicate with the respective SFE using the destination SF name.

15. The WTRU of claim 14, wherein the at least one processor, the memory and the transceiver are further configured to:

map, for each respective SFE, the destination SF name to the respective SFID using the programable middleware.

16. The WTRU of claim 14, wherein the at least one processor, the memory and the transceiver are further configured to:

determine that the association between the destination SF name and the respective SFID has changed; and update the association with a second SFID to associate with the destination SF name.

17. The WTRU of claim 14, wherein the at least one processor, the memory and the transceiver are further configured to receive one or more programmable updates from a chain operating entity, and wherein the chain operating entity is an authoritative entity, a service chain controller, or an orchestrator.

18. The WTRU of claim 14, wherein any of the respective SFID or the destination SF name is a fully qualified domain name (FQDN) or an Internet protocol (IP) address.

19. The WTRU of claim 14, wherein the respective SFE of the one or more SFEs is associated with a network function, a network function service, or a network service.

20. The WTRU of claim 19, wherein the network function service can be accessed using Internet protocols.

* * * * *